United States Patent Office 3,075,208
Patented Jan. 29, 1963

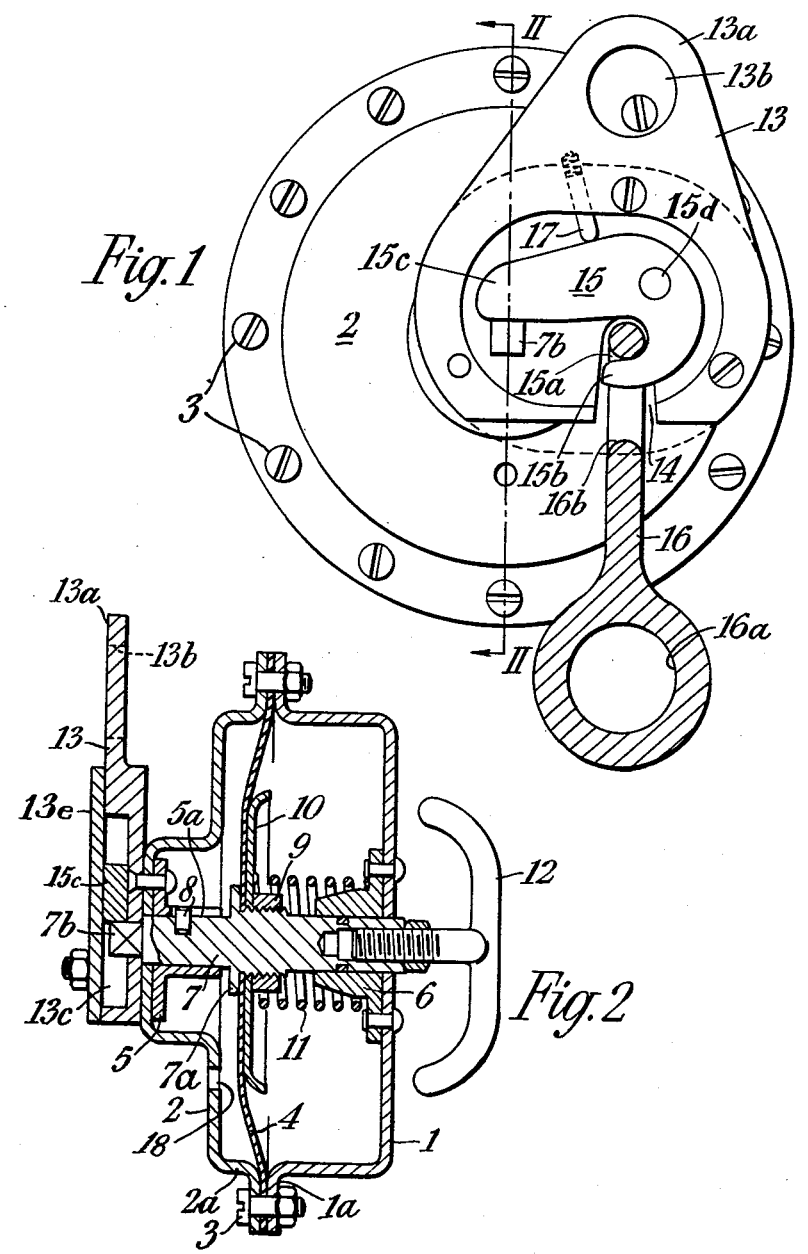

3,075,208
QUICK-RELEASE DEVICE
George Kenneth Mercer, Holbrooks, Coventry, and Douglas Dewar, Wolston, near Coventry, England, assignors to Dunlop Rubber Company Limited, London County, England, a British company
Filed Mar. 3, 1959, Ser. No. 796,855
Claims priority, application Great Britain Mar. 20, 1958
4 Claims. (Cl. 9—33)

This invention relates to quick-release devices and more particularly relates to such a device for releasing the lashings used to secure the valise of an inflatable marine life-saving raft to the cradle or the like in, or on, which it is stowed so as to be readily available for emergency use.

The object of the invention is to provide improvements in devices of this kind.

According to the invention, a quick-release device comprises a housing, an eccentrically-pivoted latch adapted to pivot to a released condition, a connecting member adapted to releasably engage a portion of said latch and having means for attaching a strap, cord, lashing or the like thereto, locking means adapted to secure said latch in an engaged condition and means to retract said locking means from said latch to permit positive pivotal movement of said latch to a released condition, whereby to cause the disengagement of said connecting member from said portion of said latch.

Preferably, but not essentially, the housing comprises a hollow body divided into two coaxial adjacent chambers by a flexible wall which is secured to said locking member. One of said chambers is airtight and contains air at atmospheric pressure, or thereabouts, and the other chamber is open to ambient pressures, and the locking member is so disposed that when the pressure differential on opposite sides of said flexible wall reaches a predetermined value the locking member will be drawn out of the path of the latch, which will then be forced into disengaged position by spring means or by the tension in the lashings pivoting it around its eccentrically-disposed pivot.

The locking member may extend through the housing away from the latch and be provided with a handle whereby the locking member can be manually withdrawn from the path of the latch.

In order that the invention may be more readily understood and carried into practice, reference will now be made to the accompanying drawings, wherein:

FIGURE 1 is a plan, with parts removed, of a quick-release device; and

FIGURE 2 is a section on the line II—II of FIGURE 1.

The quick-release device shown in the drawings is for a container or valise detachably mounted in or on a cradle or like support and containing an automatically-inflatable liferaft and comprises a housing consisting of two cup-like members 1, 2, coaxially joined together by bolts 3 through radial flanges 1a, 2a, between which is disposed the external periphery of an annular flexible diaphragm 4 which divides the housing into two coaxial adjacent chambers. Each cup-like member has a hole formed through its radial base in coaxial alignment with the hole formed within the inner periphery of the diaphragm. A radially-flanged annular bush 5, 6 is secured to the inner surface of the base of each cup-like member, coaxially of the holes therethrough, and a cylindrical locking member 7 is arranged to slide in these coaxial holes. One of the cup-like members 2 has its cylindrical periphery stepped to a smaller diameter adjacent its base, and the boss of the flanged annular bush secured to this cup-like member has a longitudinal slot 5a formed therein. A grub screw or peg 8 secured in the shaft of the cylindrical locking member 7 is located in this slot so that the locking member may be slid axially in the bushes 5, 6 relative to the housing but cannot be rotated therein.

The locking member has an enlarged diameter portion formed thereon where it is passed through the inner periphery of the diaphragm and a radially-outwardly directed flange 7a is formed thereon between the diaphragm and the slotted bush. The enlarged diameter portion of the locking member is screw threaded and a retaining nut 9 screwed thereon secures a saucer-like annular reinforcing member 10 against the adjacent side of the diaphragm and secures the inner periphery of the diaphragm against the adjacent flange. A helical compression spring 11 of predetermined rating is located between the saucer-like reinforcing member and the flange of the bush 6 in the chamber in which it is located. The end of the locking member in this latter bush has a screw-threaded recess formed therein and a handle 12 is secured in this recess for the manual withdrawal of the locking member.

The end of the locking member 7 remote from the handle protrudes through the reduced diameter portion of the stepped chamber in the form of a short squared peg 7b which is the actual locking portion of the device.

The squared end of the locking member passes through a hole in a substantially pear-shaped plate 13 which is eccentrically-disposed on the stepped end of the housing with its narrow portion 13a projecting tangentially of said stepped end. A hole 13b is formed through the narrow end of the plate and this hole is adapted to have a strap, cord, lashing or the like secured therein.

The broad end of the pear-shaped plate has an oval recess 13c formed therein with its major axis lying at right angles to the major axis of the pear-shaped plate. The recess extends deeply into the plate but not completely therethrough, and the square peg of the locking member protrudes into the recess. The recess is closed by a cover plate 13e.

On the side of the oval recess opposite to the narrow end of the pear-shaped plate, and aligned with the hole therethrough on a chord of said housing which lies at right-angles to the major axis of the oval recess, a tapered slot 14 is cut in the base of the recess and extends inwardly thereof on said chord for slightly less than half the minor axial dimension of the recess.

A hook or latch plate 15 is pivoted in the oval recess and comprises a flat plate which is generally of pear shape but has a deep recess 15a cut in the side thereof facing the tapered slot to form a hook 15b thereon and, above the hook, a lock engaging arm 15c.

The latch plate 15 is pivoted in the oval recess on a pin 15d which is mounted in the plate 13 and extends loosely through a hole formed eccentrically through the latch plate on the opposite side of the broad end thereof from the hook recess and radially-outwardly of the chord upon which the narrow end of the pear-shaped plate and the tapered recess are disposed. Thus, any pull on the hook 15b of the latch plate in the general direction of the above chord will, if the lock is disengaged, cause the latch plate to pivot so that the hook recess 15a and the tapered recess 14 come into alignment and the latch is released.

The squared peg 7b on the locking member 7 is normally spring-urged to engage and support the arm 15c of the latch plate adjacent its narrow end 15d, i.e., the end opposite its pivot, and inadvertent releasing movement of the latch plate is accordingly prevented thereby.

The hook recess is adapted to have engaged therein a releasable coupling member 16 having an eye 16a, 16b formed at each end thereof and lying in planes normal to each other. The eye 16b is of such external diameter that it will slide in the tapered recess between the base of the larger diameter portion of the stepped portion of the housing and an oval cover plate (not shown) adapted to enclose the oval recess is of such internal diameter that it will permit the hook of the latch plate to pass therethrough. The other eye 16a is adapted to have a strap, cord, lashing or the like secured therein.

A spring-loaded plunger 7 is recessed in the pear-shaped plate so that it protrudes into the oval recess and engages the opposite side of the latch plate from the recess thereof remote from the pivot, and serves to pivot the latch 15 to released position when the lock is disengaged.

The chamber containing the compression spring is hermetically sealed and contains air at atmospheric pressure and the other chamber is vented as, for example, through a hole 18 to ambient pressures. Thus, if and when the device sinks in water and the ambient pressure increases, water flows into the vented chamber through the hole 18 and presses against the diaphragm and spring to withdraw the locking member from the latch and allow the latch to pivot until the hook recess and tapered recess become aligned and the releasable member is withdrawn, thus releasing the valise from its cradle and allowing the raft to inflate and rise to the surface.

Manual operation of the device is effected merely by drawing the handle 12 away from the housing.

The pressure differential at which the device is to be automatically operable may be varied by variation in the rating of the compression spring.

It will be obvious to those skilled in the art that either the manual or the automatic operation of the device may be eliminated by omitting either the handle or the diaphragm, respectively.

The hydrostatic form of the device ensures that a vessel equipped with cradle-stowed inflatable life rafts cannot go to the bottom with the rafts unreleased, since even if the ship sinks before the equipment can be manually released, such release will be effected automatically as soon as the equipment is immersed to a depth of, say, one or two fathoms.

Having now described our invention, what we claim is:

1. A quick release device for releasing the lashings of a life-saving raft comprising a hollow body, a flexible wall secured across said body forming two chambers, one being hermetically sealed and the other open to ambient pressures, a plate secured to said body, the plate having a recess and a slot opening through the base of the recess, a pivot mounted in said plate and extending into said recess and displaced to one side of said slot, a latch pivotable on said pivot and having a hook portion and a lock-engaging arm both extending away from said pivot in the direction of said slot when in locking position, a locking pin secured to said flexible wall, movable in a direction normal to the pivotable plane of the latch and having a squared end projecting into said recess to abut an edge of said lock engaging arm when said latch is in locking position, and a cover closing said recess, wherein a connecting member can be retained in said slot by said hook portion when said squared end is in locking position to abut said edge of the lock engaging arm and can be released by rotation of said latch about said pivot on movement of said squared end out of abutment with said lock engaging arm by a pressure differential across said flexible wall.

2. A quick release device for releasing the lashings of a life-saving raft, said device comprising a hollow body, a flexible wall secured across said body dividing said body into two chambers, one being hermetically sealed and the other open to ambient pressures, a plate secured to said body and having a recess in one side and a slot opening into said recess in a plane parallel to said side of said plate, said plate having a fastening means, said recess being between said fastening means and said slot, a pivot in said recess at one side of a line between said fastening means and said slot, a latch pivoted on said pivot and having a hook portion and a lock engaging arm extending away from said pivot and across the line between said fastening means and said slot when said latch is in a locking position, a locking pin secured to and movable by said flexible wall in a direction normal to the pivotal plane of the latch and having an end projecting into said recess to abut an edge of the lock engaging arm of said latch beyond the end of said hook and on the same side thereof as said hook, a cover for said recess, a connecting member extending through said slot and retained by said hook when said locking pin is in locking position abutting the edge of the lock engaging arm of said latch and released when said locking pin is withdrawn by said flexible wall.

3. A device as claimed in claim 2 wherein a handle is secured to said locking member to permit manual release of said latch.

4. A device as claimed in claim 2 wherein the connecting member has a ring at one end releasably engaged by said latch, and a ring at the other end for attachment of the lashing of the raft.

References Cited in the file of this patent

UNITED STATES PATENTS

| | | |
|---|---|---|
| 1,253,455 | Adams | Jan. 15, 1918 |
| 2,014,963 | Coder | Sept. 17, 1935 |
| 2,360,848 | Bryant | Oct. 24, 1944 |
| 2,547,313 | Grosser | Apr. 3, 1951 |
| 2,608,812 | Hutchings | Sept. 2, 1952 |
| 2,654,135 | Grizzard et al. | Oct. 6, 1953 |
| 2,824,315 | McKenny | Feb. 25, 1958 |
| 2,839,767 | Sieverts | June 24, 1958 |
| 2,840,327 | Stanley | June 24, 1958 |
| 2,863,200 | Miller et al. | Dec. 9, 1958 |